United States Patent [19]
Mayfield

[11] Patent Number: 5,152,207
[45] Date of Patent: * Oct. 6, 1992

[54] ANTI-KICK FORWARD DEVICE FOR POWER DRIVEN SAWS

[75] Inventor: Alfred B. Mayfield, Halstead, Kans.

[73] Assignee: Ryobi America Corp., Anderson, S.C.

[ * ] Notice: The portion of the term of this patent subsequent to Nov. 12, 2008 has been disclaimed.

[21] Appl. No.: 616,670

[22] Filed: Nov. 21, 1990

Related U.S. Application Data

[63] Continuation-in-part of Ser. No. 545,279, Jun. 28, 1990, Pat. No. 5,063,806.

[51] Int. Cl.⁵ .............................................. B26D 1/18
[52] U.S. Cl. ..................... 83/485; 83/471.3; 83/486.1; 83/DIG. 1; 188/82.87; 192/45
[58] Field of Search ..................... 83/471.2, 471.3, 483, 83/484, 485, 486.1, DIG. 1, 76; 192/7, 41 R, 45; 188/82.84, 139

[56] References Cited

U.S. PATENT DOCUMENTS

| | | | |
|---|---|---|---|
| 4,590,831 | 5/1986 | Brodin | 83/485 |
| 4,620,352 | 11/1986 | Sulej | 29/251 |
| 4,870,882 | 10/1989 | Faxon, Sr. | 83/486.1 |
| 5,052,255 | 10/1991 | Gaines | 83/62.1 |

Primary Examiner—Frank T. Yost
Assistant Examiner—Kenneth E. Peterson
Attorney, Agent, or Firm—Brooks & Kushman

[57] ABSTRACT

A saw includes a mounting arm or linear slide area, a carriage mounted on the arm for linear movement in first and second directions along the arm or slide area, a saw blade mounted on the carriage for rotational movement relative to the carriage about an axis of rotation extending in a direction transverse to the linear direction of travel of the carriage, and power means adapted to rotate the saw blade about the axis of rotation for carrying out a sawing operation. A kick-preventing apparatus, which may be produced as a retrofittable device, is provided for limiting the maximum speed at which the carriage may be moved in the first direction to a predetermined speed, the kick-preventing means permitting the carriage to be moved in the first direction at any speed equal to or less than the predetermined speed while preventing the carriage from kicking along the arm or slide in the first direction at a speed greater than the predetermined speed.

12 Claims, 3 Drawing Sheets

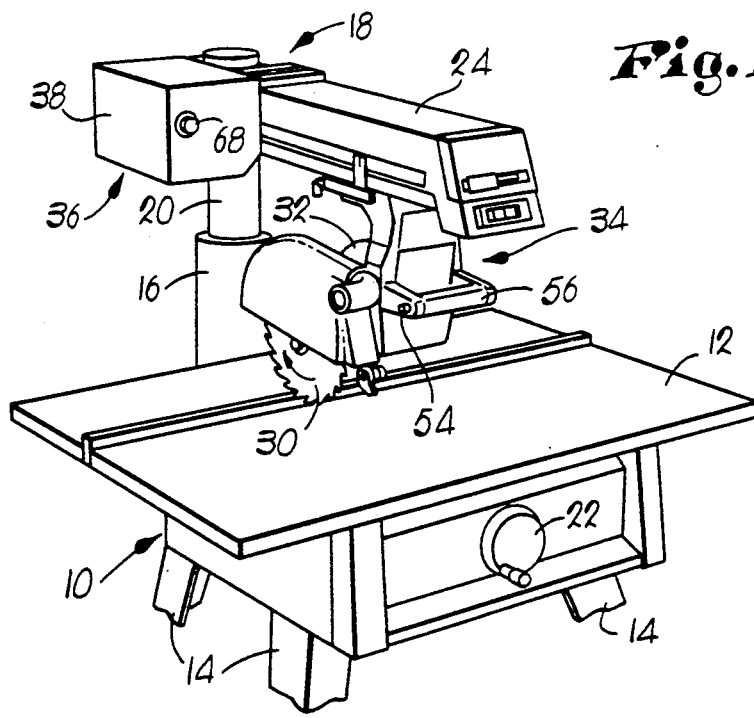
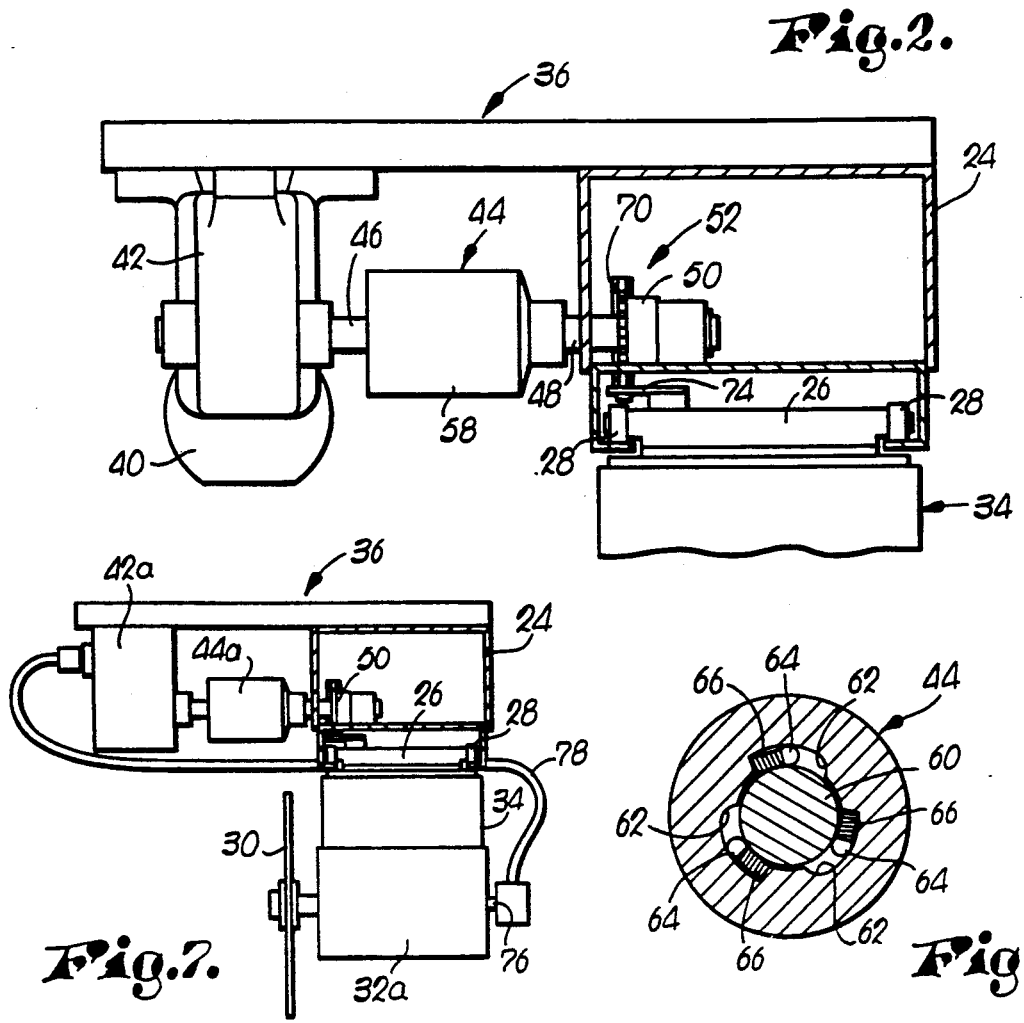
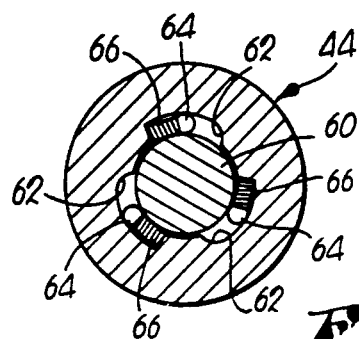

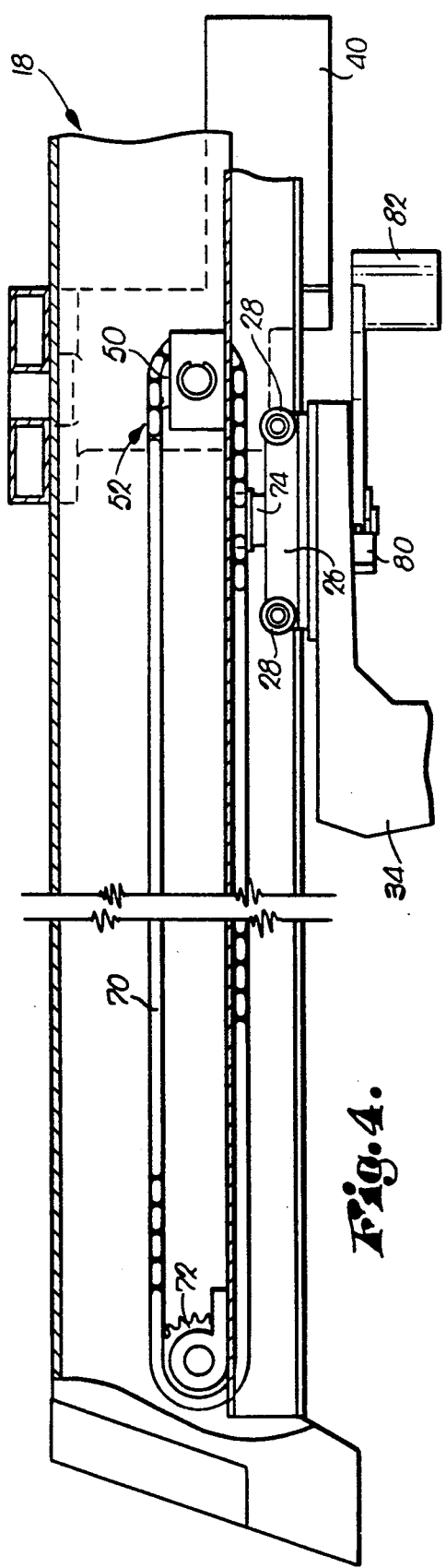
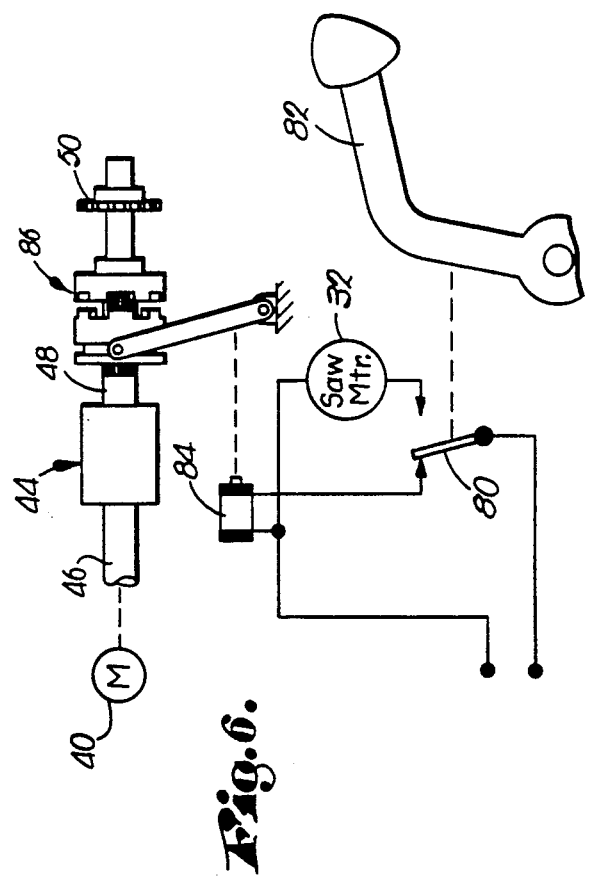
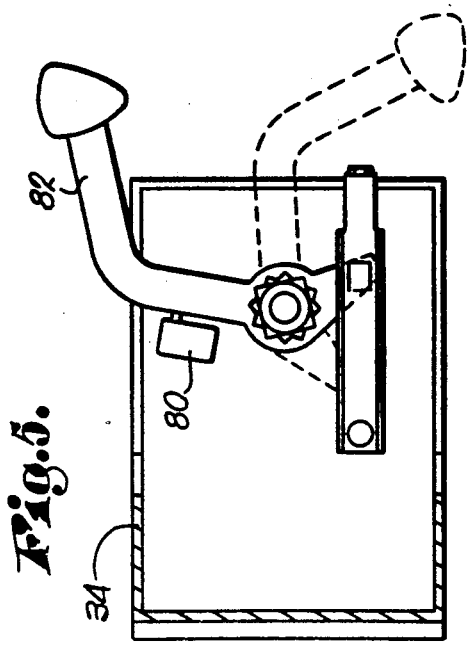

ANTI-KICK FORWARD DEVICE FOR POWER DRIVEN SAWS

RELATED APPLICATIONS

The present application is a continuation-in-part application of U.S. application Ser. No. 07/545,279 filed on Jun. 28, 1990, now U.S. Pat. No. 5,063,806.

BACKGROUND OF THE INVENTION

1. Field of the Invention

The present invention relates generally to power driven saws and, more particularly, to a kick-forward preventing apparatus for use on such saws to prevent a movable carriage provided on the saw from kicking toward an operator of the saw.

2. Discussion of the Prior Art

Power driven saws such as radial arm saws and compound saws are commonly used by carpenters and craftsmen to perform a variety of wood working operations. An example of one type of radial arm saw is the Sears/Craftsman 10" Radial Saw, which includes, among other features, a support frame for supporting the apparatus on the floor of a workshop or the like, and a mounting arm having a vertical pivot axis and means for mounting the arm on the frame for pivotal movement about the pivot axis. A carriage is mounted on the arm for radial movement along the arm relative to the pivot axis, and a saw blade is supported on the carriage for rotational movement relative to the carriage such that a power means may be actuated to rotate the saw to carry out a sawing operation. Of course, numerous companies market similar saws, and the problems discussed below are experienced in the use of these other available devices as well as in compound saws and any other power driven saws wherein a movable carriage is provided which tends to kick toward an operator under at least certain operating conditions.

With respect to radial arm saws, by providing a saw having a radial arm for use in supporting the saw blade and carriage, an apparatus results which is extremely versatile. For example, because the carriage is movable along the arm in the radial direction of the pivot axis, and due to the construction of the arm which permits the arm to be pivoted relative to the frame, it is possible to run the saw blade over a work table of the frame at any desired angle relative to the pivot axis. Thus, crosscuts at any desired angle may be made consistently by simply orienting the arm at the desired angle and moving the carriage in the radial direction of the arm.

Further, by providing for rotational movement of the carriage relative to the arm, the saw blade may be oriented for rotation about an axis extending in a direction parallel to the direction in which the arm extends such that rip sawing is possible. In such applications, wood is passed lengthwise beneath the carriage and saw blade while the blade is rotating such that a lengthwise cut is made without the carriage being moved.

A common problem experienced during the use of radial saws in making crosscuts includes the tendency of the carriage of such saws to kick away from the pivot axis of the arm toward an operator when the rotating blade encounters resistance in the material being cut. This kicking action of the carriage is a result of the movement force exerted on the carriage by the rolling action of the blade which occurs when the blade encounters such resistance, and can create serious safety risks to the operator. For example, when the carriage kicks toward the operator during a sawing operation, it is possible that the operator will be unprepared for such movement and may have their hand in the path of the blade such that injury would result from the unexpected carriage movement. Similar problems arise in connection with undesirable movement of a carriage in other known power tools.

OBJECTS AND SUMMARY OF THE INVENTION

It is an object of the present invention to provide a kick-preventing apparatus for use with power driven saws which will eliminate the above-mentioned problems in existing saws and which will permit such saws to be used safely without the risk of unexpected, sudden movements of a movable carriage of the saws that could, under normal circumstances, result in injury.

It is a further object of the present invention to provide such a kick-preventing apparatus which is capable of being assembled on a preexisting power driven saw such that the apparatus may be produced separately from such saws and retrofitted to provide the desired safety features in those pre-existing devices.

In accordance with these and other objects, one aspect of the invention relates to a power driven saw including a support frame, a mounting arm having a vertical pivot axis and means for mounting the arm on the frame for pivotal movement about the pivot axis, and a carriage mounted on the arm for radial movement along the arm relative to the pivot axis. A saw blade is supported on the carriage for rotational movement relative to the carriage, and power means are included for rotating the saw blade. Kick-preventing means limiting the maximum speed at which the carriage may be moved away from the pivot axis in the radial direction to a predetermined speed. The kick-preventing means permits the carriage to be moved radially outward from the pivot axis at any speed equal to or less than the predetermined speed while preventing the carriage from kicking radially outward from the pivot axis at a speed greater than the predetermined speed.

By providing this construction of a saw, numerous advantageous results are achieved. For example, by limiting the maximum speed of travel of the carriage away from the pivot axis toward the operator, it is possible to protect against sudden kicking movement of the carriage which may be motivated by grabbing of the saw blade in hard wood or the like that is being sawed. By preventing such kicking movement, the carriage handles more smoothly than in saws having no such kick-preventing means, and there exists less of a chance of injury to the operator.

Another advantage achieved through the use of a saw constructed in accordance with the invention includes the savings in time resulting from limiting the maximum speed of movement of the carriage away from the pivot axis. During operation of a conventional saw, it is common for the saw blade to stop rotating when the carriage kicks into the work material by an amount sufficient to cause grabbing of the blade by the work material. When rotation of the blade is stopped, the motor is temporarily overloaded until the blade is withdrawn from the work material and the motor shaft is permitted to return to the full speed of the motor. These temporary overloads of the motor shorten the life of the motor, and repeated grabbing of the saw blade tends to dull the blade, thus reducing the life of the blade as well.

By constructing a saw in accordance with the present invention, it is possible to set the maximum speed of movement of the carriage of the saw such that it is difficult or impossible in any given application for an operator to move the carriage quickly enough to force stoppage of the saw blade. Thus, an operator is able to repeatedly carry out sawing operations without experiencing blade stoppage. Due to this ability, the time used to carry out a number of sawing operations may actually decrease even though the speed of the carriage is limited to a maximum value. Further, by preventing stoppage of the saw blade, the life of both the blade and the saw motor is lengthened.

Further, by providing a kick-preventing apparatus capable of being retrofitted on pre-existing power saws, all of the above-mentioned advantages may be realized in previously constructed devices in order to render such devices more safe to use than when originally produced.

BRIEF DESCRIPTION OF THE DRAWING FIGURES

A preferred embodiment of the invention is described in detail below with reference to the attached drawing figures, wherein:

FIG. 1 is a perspective view of a radial arm saw constructed in accordance with a preferred embodiment of the present invention and including a kick-preventing assembly having a cover;

FIG. 2 is a cross-sectional view of the radial arm of a saw illustrating various components of the kick-preventing assembly with the cover removed;

FIG. 3 is a sectional view of an exemplary over-running clutch for use in the kick-preventing assembly;

FIG. 4 is a side-sectional view of a radial mounting arm of the saw illustrating a carriage of the saw and further aspects of the kick-preventing assembly;

FIG. 5 is a bottom sectional view of a handle assembly which is supported on the carriage and which includes a lever for permitting disengagement of the kick-preventing assembly from the carriage;

FIG. 6 is a schematic view of the lever and an electrical circuit controlled by the lever;

FIG. 7 is a cross-sectional view of the radial arm of a saw illustrating various modifications to the kick-preventing assembly;

DETAILED DESCRIPTION OF THE PREFERRED EMBODIMENT

Figure 8:
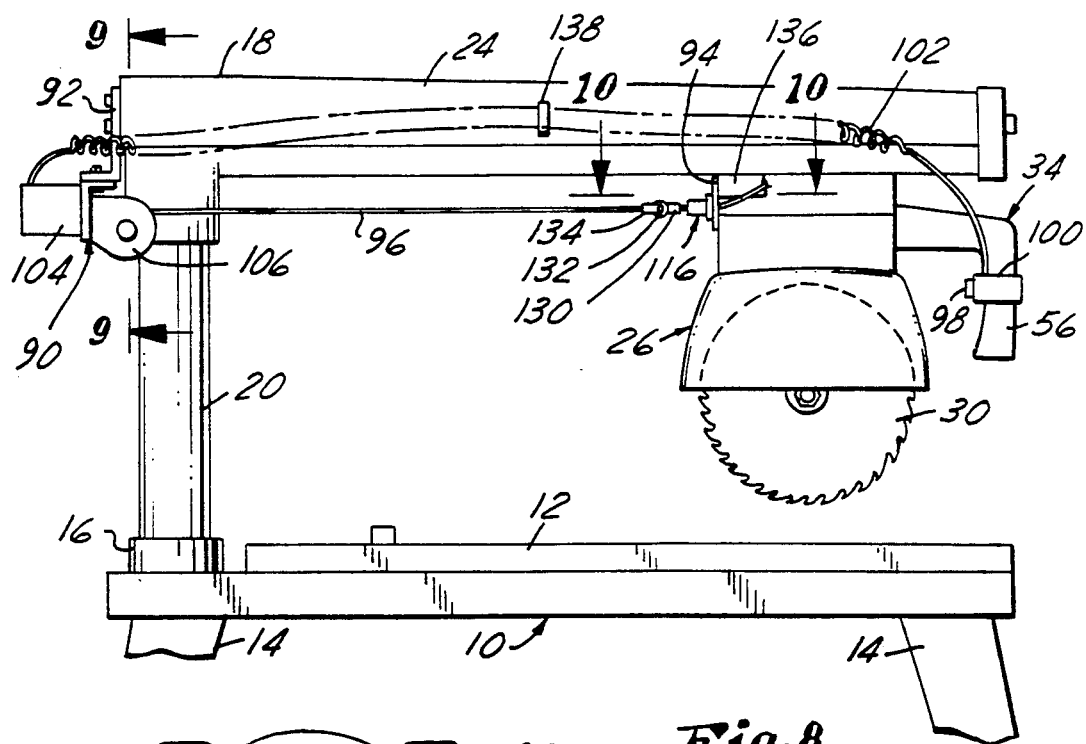
FIG. 8 is a side elevational view of a kick-preventing apparatus constructed in accordance with the present invention which has been retrofitted on a pre-existing radial arm saw.

A radial arm saw constructed in accordance with the present invention is illustrated in FIG. 1, and includes a support frame 10 having a work table 12 and a set of legs 14 for supporting the work table at a predetermined height above a working area floor. Although the preferred embodiment of the invention is illustrated and discussed in connection with a radial arm saw, it is possible to employ the invention with other power driven tools such as compound saws and the like.

The frame 10 of the saw includes an upstanding portion 16 adjacent the work table 12 adapted to receive a mounting arm assembly 18 in such a manner as to permit pivotal movement of the arm assembly relative to the frame. The arm assembly 18 includes a vertical cylindrical portion 20 adapted to extend downward into the upstanding portion 16 of the frame 10 such that relative rotational movement therebetween is prevented and vertical movement of the cylindrical portion 20 is only permitted during intentional adjustment thereof as may be carried out in a conventional manner, such as by a rack and pinion arrangement (not shown) operated through a hand crank 22.

A mounting arm 24 of the arm assembly 18 extends radially outward from the cylindrical portion 20 and is fixed to the cylindrical portion against vertical movement thereon. However, the arm 24 is rotatable relative to the cylindrical portion 20 between any of a plurality of angular positions in order to permit the arm to be disposed above the work table 12 at any desired angle.

As best shown in FIG. 4, a carriage 26 is mounted on the arm 24 and is movable along the arm in a radial direction relative to the cylindrical portion 20. The carriage 26 is supported on the arm 24 by a set of rollers 28 or the like which permit linear movement of the carriage while preventing any significant amount of travel in any direction other than along the arm.

Returning to FIG. 1, a saw blade 30 is mounted for rotational movement relative to the carriage 26, and the carriage is also fitted with a saw motor 32 for driving the rotational movement of the blade. Typically, the blade 30 and motor 32 are movable together about a horizontal axis relative to the carriage 26 between a plurality of positions such that the angle of the blade may be adjusted to carry out various beveled crosscuts and rip cuts. In addition, the saw blade 30 and motor 32 may be mounted on a handle assembly 34 that is rotatable relative to the carriage 26 about a vertical axis between a crosscutting position in which the axis of rotation of the blade extends transverse to the length of the arm, and a rip cutting position in which the axis of rotation of the blade extends in a direction parallel to the length of the arm.

The radial arm saw as thus far described reflects those constructions already discussed above and known in the art. Numerous changes and modifications may be made to the basic saw apparatus without departing from the scope of the invention as set forth in the attached claims.

Also shown in FIG. 1 is a first embodiment of a kick-preventing means 36 for limiting the maximum speed at which the carriage 26 may be moved along the arm 24 in the outward radial direction to a predetermined speed. This kick-preventing means 36 permits the carriage 26 to be moved radially outward from the pivot axis at any speed equal to or less than the predetermined speed while preventing the carriage from kicking radially outward from the pivot axis at a speed greater than the predetermined speed. A cover 38 is provided on the saw to protect against an operator coming into contact with moving parts of the kick-preventing means 36.

Turning to FIG. 2, the kick-preventing means 36 is illustrated as including a drive motor 40 separate from the saw motor 32, a gear box 42 adjacent the drive motor, and an over-running clutch 44 having an input shaft 46 extending between the gear box and the clutch and an output shaft 48 extending between the clutch and a sprocket 50 of a carriage-movement control assembly 52.

Although in the preferred embodiment of the invention the drive motor 40 of the kick-preventing means 36 is separate from the motor 32 used to rotate the saw blade 30, it is possible to use the saw motor 32 to both rotate the saw blade and operate the kick-preventing means, as shown in FIG. 7, and certain advantages are realized from such a construction which are discussed further below.

Turning back to FIG. 1, a button or switch 54 is located within easy reach of the operator, preferably on or near a pull-handle 56 provided on the handle assembly 34. This switch 54 activates the motor 40 when pushed to an "ON" position and initiates operation of the kick-preventing means 36. When the switch 54 is released, it moves to an "OFF" position and the motor 40 is turned off. When the kick-preventing means is in this "OFF" mode, the over-running clutch 44 prevents the carriage 26 from being moved in a direction away from the axis of the arm 24 toward the operator while permitting free, unrestricted movement of the carriage in the opposite direction toward the pivot axis of the arm.

The over-running clutch 44 is illustrated in FIG. 3, and is of conventional construction. Preferably, the clutch 44 includes an outer cylindrical member 58 connected to the input shaft 46 and an inner shaft 60 connected to or forming the output shaft 48. The outer member 58 includes a plurality of circumferential slots 62 each including a shallow end and a deep end, and being adapted to each receive a ball 64 and a compression spring 66 therein. The springs 66 normally bias the balls 64 in the clockwise direction, as shown in the figure, such that the balls move toward the shallow ends of the slots 62 forcing the balls against the inner shaft 60.

In this manner, the inner shaft 60 is prevented from rotating in the clockwise direction relative to the outer member 58. However, the inner shaft 60 is not prevented from rotating in the counterclockwise direction relative to the outer member 58 since this movement of the inner shaft moves the balls 64 toward the deep ends of the slots 62 against the bias of the springs 66 such that the balls are removed from holding contact with the inner shaft.

During rotation of the outer member 58 in the clockwise direction, the inner shaft 60 is free to rotate in the clockwise direction at any speed less than the speed of the outer member. If the speed of the inner shaft increases above the speed of the outer member, the balls 64 move toward the shallow ends of the slots 62 and prevent the inner shaft from moving relative to the outer member. The rotational movement of the outer member 58 does not, however, effect the ability of the inner shaft 60 to be rotated in the counterclockwise direction. Thus, by rotating the outer member 58 at a desired speed, the maximum speed of the inner shaft 60, and thereby the output shaft 48, may be controlled.

As shown in FIG. 1, a rheostat 68 or other known regulating device may be provided as a part of the kick-preventing means 36 for controlling either the speed of the drive motor 40 or the speed at which the motor rotates the input shaft 46 and thus the outer member 58 of the over-running clutch 44. By providing such control of the speed of the outer member 58 of the clutch 44, the maximum speed at which the output shaft 48 is permitted to rotated may be varied.

The carriage-movement control assembly 52 is shown in FIG. 4, and includes a chain 70 or the like extending around the sprocket 50 and around another, similar sprocket 72. The assembly 52 also includes a bracket 74 extending between the chain 70 and the carriage 26 for connecting the chain to the carriage. The sprocket 50 is fixedly attached to the output shaft 48 of the clutch 44 so that the sprocket is free to rotate in the counterclockwise direction, as shown in FIG. 4, while being limited in its ability to rotate in the clockwise direction by the rotational movement of the over-running clutch 44 as discussed above. Thus, the carriage 26 is prevented from moving toward the operator, to the left in FIG. 4, at any speed greater than that permitted by the over-running clutch 44. However, the carriage 26 is free to move away from the operator, or to the right as shown in FIG. 4.

During operation of the saw in crosscutting operations, the carriage 26 is always free for movement in the direction away from the operator toward a retracted position adjacent the cylindrical portion 20 of the arm assembly 18, and this movement of the carriage is not effected by the condition of the switch 54. However, as mentioned, movement of the carriage 26 in the opposite direction toward an operator is prevented completely when the switch 54 is in the "OFF" position. Specifically, when the switch 54 is "OFF", the motor 40 is deactivated and no movement is imparted to the outer member 58 of the over-running clutch 44. When the outer member 48 of the clutch 44 is stationary, any movement of the inner shaft 60 in the clockwise direction, as shown in FIG. 3, which is caused by movement of the carriage 26 is precluded by the action of the balls 64 moving toward the shallow ends of the slots 62 and engaging the inner shaft 60. Because the kick-preventing means 36 locks the carriage 26 against movement toward the operator when the switch is "OFF", it is impossible for the carriage to kick toward an operator should the operator turn on the saw motor 32 without grabbing hold of the carriage. When a crosscut is to be made, the saw motor 32 is turned on, and the operator grabs hold of the handle 56 and moves the switch 54 to the "ON" position. Thereafter, the motor 40 is energized causing rotation of the outer member 58 of the over-running clutch 44. The speed of rotation of the outer member 58 is established by the gear ratio within the gear box 42 and/or the speed of the motor 40 as modified by the rheostat 68. Further, the speed of the outer member 58 limits the speed at which the output shaft 48 may rotate such that the sprocket 50 is only allowed to rotate in the clockwise direction, as shown in FIG. 4, at a speed less than the speed of the outer member.

If an operator desires to vary the maximum speed at which the carriage 26 is movable away from the pivot axis of the arm 24, it is only necessary to adjust the rheostat 68 to control the resistance in the motor 40 such that the motor operates at a different speed resulting in the outer member 58 being rotated at a corresponding different speed.

Where a saw motor 32a is used as the drive means for the kick-preventing means 36, as shown in FIG. 7, variation of the maximum speed at which the carriage 26 may be moved away from the pivot axis of the arm 24 is automatically carried out in dependence on the speed of rotation of the saw blade 30. Specifically, the motor 32a is provided with an auxiliary output shaft 76 having a pinion gear or the like (not shown) which is connected to a gear box 42a via a rotatable cable 78 extending between the auxiliary shaft and the gear box. The gear box 42a is preferably one which permits adjustment of the gear reduction ratio between the input speed and the output speed such that it is possible to adjust the speed at which the outer member 58 of the over-running clutch 44 is rotated.

By providing this connection between the saw motor 32a and the over-running clutch 44, it is possible to tie the maximum speed at which the carriage 26 may be moved toward the operator to the speed of rotation of the saw blade 30. When the saw blade 30 is grabbed by the work material, the saw motor 32a is also slowed, resulting in a corresponding slowing of the rotation of the outer member 58 of the over-running clutch 44. Thus, "slugging" of the saw, which occurs when the blade 30 is grabbed by the work piece, has the effect of slowing the maximum speed at which the carriage 26 is movable toward the operator. This result of employing the saw motor 32a in driving the outer member 58 of the over-running clutch 44 is beneficial since it permits the kick-preventing means to aid in preventing such "slugging" of the saw by slowing movement of the saw blade 30 through the work material as the speed of rotation of the blade is reduced.

A further modification to the above-described embodiment of the invention includes the use of a kick-preventing override assembly for overriding the locking action of the kick-preventing means when the switch is in the "OFF" position. This override assembly is illustrated in FIGS. 5 and 6, and includes a switch 80 positioned on the carriage 26 at a position adapted to be engaged by a lever 82 when the lever is moved to an "OVERRIDE" position as shown in FIG. 5.

The lever 82 is movable between a first position, shown in a dashed line in FIG. 5, out of contact with the switch 80, and a second position, shown in a solid line in FIG. 6, in contact with the switch. As shown in FIG. 6, the switch 80 is operable to energize a solenoid 84 which is operable to disengage a clutch 86 which may be provided in line with the over-running clutch 44 between the clutch 44 and the sprocket 50 such that when the clutch 86 is disengaged, the sprocket 50 is free to rotate in either direction without interference from the kick-preventing means 36.

In this manner, when it is desired to move the saw blade 30 to a rip cutting position, the lever 82 is moved to the second position as shown in FIG. 5, the switch 80 is moved to the position shown in FIG. 6, the saw motor 32 is de-energized, and the kick-preventing means 36 is separated from the sprocket 50. Thereafter, the carriage 26 may be moved to any desired position in the radial direction of the arm 24 and the handle assembly 34 may be rotated relative to the carriage. During these movements, the saw motor 32 is prevented from being energized in order to prevent any injury that might result from the motor being turned on accidentally.

Although the above-described embodiment of the invention has been described with reference to the illustrated preferred embodiment, substitutions may be made and equivalents employed herein without departing from the scope of the invention as recited in the attached claims. For example, it is possible to replace the chain and sprocket of the carriage-movement control assembly with a worm screw rack extending the length of the mounting arm and a bull gear attached to the carriage through an over-running clutch such that the cover-running clutch limits the maximum speed of relative movement which can be carried out between the carriage and the arm.

Alternately, the mechanical means may be replaced partially or completely by electronic equivalents which perform substantially the same function to achieve similar results. For example, it is possible to provide a carriage speed sensing circuit on the carriage and/or mounting arm of the saw and to employ a controller for sensing the carriage speed and controlling the maximum speed at which the carriage may be moved before a brake or the like is actuated to slow the carriage travel speed.

A second preferred embodiment of the invention is illustrated in FIG. 8, and includes a kick-preventing apparatus detachably supported on a radial arm saw. As mentioned with respect to the previously described embodiment, use of the kick-preventing apparatus is not limited to radial arm saws but may also include compound saws and other power driven tools. The parts of the saw are substantially identical to those illustrated in FIG. 1 and discussed above, and are referenced in the following discussion in the same manner as referenced above.

The kick-preventing apparatus includes generally a motor and drum assembly 90, a motor bracket 92, a carriage bracket 94, a carriage-movement control member 96 extending between the motor and drum assembly and the carriage bracket, a switch 98 attached to the pull-handle 56 of the handle assembly 34 by a clamp 100, and an electrical connector 102 extending between the switch 98 and the motor and drum assembly.

Figure 9:
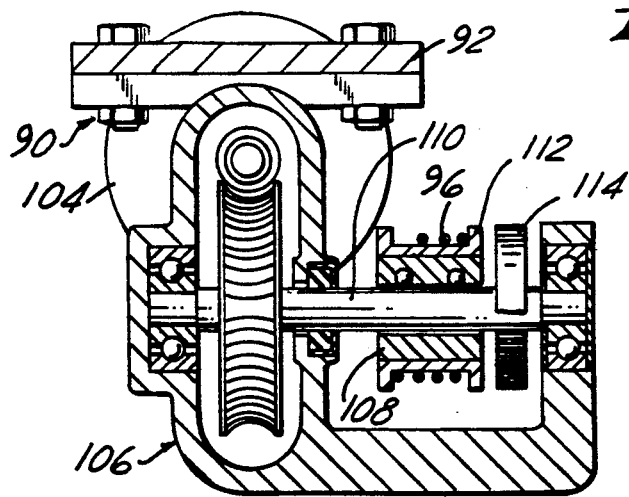
FIG. 9 is a sectional view of a motor and drum assembly making up a part of the kick-preventing apparatus of FIG. 8.

More specifically, the motor and drum assembly 90, which is illustrated in FIG. 9, includes a drive motor 104 separate from the motor 32 of the saw, a gear box 106 adjacent the drive motor 104, and an over-running clutch 108 having an input shaft 110 extending between the gear box and the clutch. Although in the preferred embodiment of the invention the drive motor 104 is separate from the saw motor 32, it is possible to use the saw motor to both rotate the saw blade 30 and operate the kick-preventing apparatus in a manner similar to that described above with reference to the first preferred embodiment of the invention.

The over-running clutch 108 is formed of an annular member provided with a plurality of circumferential slots 62 as described above, each including a shallow end and a deep end and being adapted to receive a ball 64 and a compression spring 66 therein. The springs 66 normally bias the balls 64 in a direction toward the shallow ends of the slots 62 thus urging the balls against the inner shaft 60. In this manner, the annular member 108 is prevented from rotating relative to the input shaft 110 in the clockwise direction as viewed in FIG. 8. However, the annular member 108 is not prevented from rotating in the counterclockwise direction relative to the input shaft 110 since such movement moves the balls 64 toward the deep ends of the slots 62 against the bias of the springs 66 such that the balls are removed from holding contact with the input shaft.

An annular drum 112 is secured to the annular member 108 and includes a cylindrical outer surface around which the carriage-movement control member 96 is wrapped. The carriage-movement control member 96 preferably includes a pliant cable or tape capable of transmitting tensile loads and adapted to be wrapped around the drum 112 when the carriage 26 is moved radially inward along the arm 24 toward the cylindrical portion 20.

A torsion spring 114 is mounted on the annular member 108 at a position adjacent the over-running clutch 108 and includes a first end affixed to the annular member and a second end affixed to the frame of the motor and drum assembly such that the spring biases the drum in a direction tending to wind the cable 96 onto the drum. In accordance with the preferred construction, the cable 96 is of a type suitable for use in the aircraft industry and is capable of withstanding the cyclical loading conditions experienced by the apparatus during the life of the saw.

Figure 10:
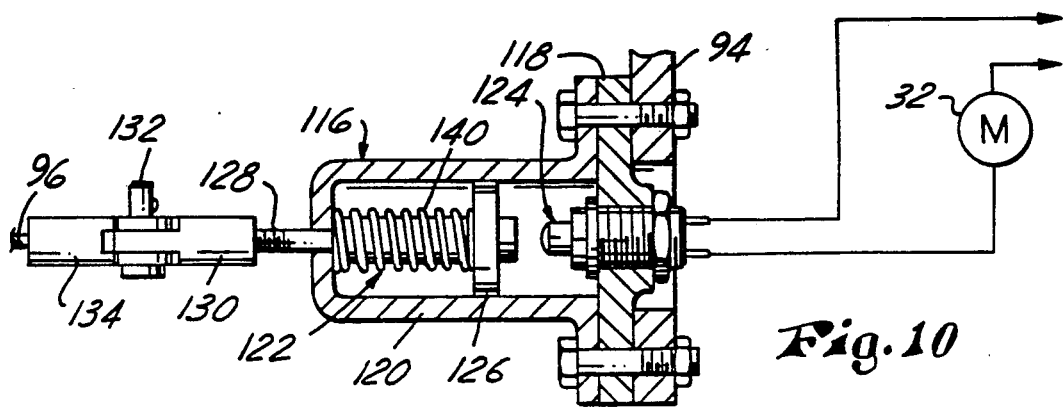
FIG. 10 is a partially schematic sectional view of a safety switch assembly making up a part of the kick-preventing apparatus of FIG. 8.

The carriage bracket 94 is shown in FIG. 10, and includes a safety switch assembly 116 interposed between the bracket and the cable 96. The safety switch assembly 116 includes a base plate 118 and a plunger housing 120 both attached to the bracket, and a plunger 122 disposed within the housing for translational movement relative thereto. A normally closed contact switch 124 is also affixed to the base plate 118 and is exposed to the plunger 122 within the housing 120 such that the switch is opened upon engagement of the switch by the plunger. The plunger 122 inlcudes an annular positioning piston 126 which controls the direction of movement of the plunger within the housing 120, a compression spring 140 interposed between the piston and the housing 120, and a threaded end portion 128 which protudes from the housing and is adapted to receive a first cable termination element 130. The first cable termination element 130 is threaded on the threaded end portion 128 and includes a transverse hole at an opposite end thereof for receiving a quick disconnect pin 132. A second cable termination element 134 is secured to one end of the cable 96 and includes a transverse hole adapted to align with the hole of the first termination element so that the quick disconnect pin 132 operates to connect the cable with the plunger. The normally closed contact switch 124 is disposed in the circuit including the drive motor 40 of the saw and is operable to de-energize the saw motor upon opening of the switch 124 as described more fully below. Returning to FIG. 8, a safety brake assembly 136 is shown which includes an electrical connection with the safety switch assembly 116. The safety brake assembly 136 is adapted to lock the carriage 26 relative to the mounting arm 24 of the saw when the normally closed switch is opened.

Although any conventional type of brake assembly may be used to provide this braking operation to the carriage, one possible embodiment of the assembly includes a caliper device having a pair of calipers which are normally held apart when the switch is closed, and which are biased toward each other such that when the switch is opened the calipers move toward one another and into engagement with a pre-existing or retrofitted flange on the radial arm of the saw.

Another possible construction of the brake assembly would include the use of a solenoid having a plunger which is held in a retracted position when the switch is closed and which is biased toward an extended position when the switch is opened. A rack is retrofitted on the radial arm of the saw and includes a plurality of teeth which are engaged by the plunger when the plunger is in the extended position such that the carriage is held against radially outward movement relative to the radial arm.

In order to assemble the kick-preventing apparatus on an existing saw, the motor bracket 92 is secured to the mounting arm 24 of the saw and the carriage bracket 94 is secured to the carriage 26. Thereafter, the motor and drum assembly 90 is mounted on the motor bracket 92 and the cable 96 is attached to the carriage bracket 94 so that any movement on the carriage away from the motor and drum assembly requires the cable to be unwrapped from the drum 112 causes the drum to rotate in the clockwise direction as viewed in FIG. 8.

The trigger switch 98 is secured to the pull-handle 56 of the handle assembly 34 by the clamp 100, and the electrical connector 102 is mounted on the mounting arm 24 is such a way as to permit electrical connection between the switch 124 and the motor 104 while also permitting movement of the carriage 26 along the arm 24. For example, the electrical connector 102 may be formed of a flexible coiled element which may be supported on the arm 24 by a tab 138 that keeps the connector out of the working area beneath the arm of the saw. In addition, the brake assembly 136 is mounted on the saw in accordance with the discussion provided above.

In operation, the switch 98 activates the motor 104 when pushed to an "ON" position and initiates operation of the kick-preventing apparatus. When the switch 98 is released, it automatically moves to an "OFF" position and the motor 104 is turned off. When in this "OFF" mode, the over-running clutch 108 and the cable 96 prevent the carriage 26 from being moved in a direction away from the axis of the arm 24 toward the operator while permiting free, unrestricted movement of the carriage in the opposite direction toward the pivot axis of the arm. Slack in the cable 96 is prevented from forming due to the presence of the torsion spring 114 which winds the cable onto the drum in a counterclockwise direction, as viewed in FIG. 8, as quickly as the carriage 26 is moved toward the pivot axis of the arm 24. In addition, the torsion spring 114 continuously exerts a tensile force on the cable 96 sufficient to hold the plunger 122 of the safety switch assembly 116 in a retracted position out of engagement with the normally closed switch 124 in opposition to a compression spring 140 disposed within the housing.

Regardless of the position of the switch 98, in the event that the cable 96 becomes disconnected from the carriage 26, e.g. via breakage of the cable or loss of the disconnect pin 132, the force of the compression spring 140 is sufficient to move the plunger 122 into engagement with the switch 124 causing the switch 124 to be opened. When this opening of the switch 124 occurs, power to the saw motor 32 is cut-off disabling the saw, and the brake assembly 136 is de-energized and moved to a locked position wherein the carriage 26 is prevented from being moved relative to the arm 24.

Thus, by providing the safety switch assembly 116 between the cable 96 and the carriage 26, the saw is disabled and the carriage is locked against movement whenever the cable of the kick-preventing apparatus is disengaged from the carriage bracket 94.

When the switch 98 is moved to the "ON" position, the motor 104 rotates the input shaft 110 in a clockwise direction as viewed in FIG. 8, at a predetermined desired speed which establishes the maximum speed at which the carriage 26 is to be moved relative to the arm 24. This clockwise rotation of the input shaft 110 permits rotation of the over-running clutch 108 in the same direction at any speed less than the speed of the output shaft. Any attempt to rotate the over-running clutch 108 at a speed greater than the speed of the input shaft 110 causes the balls 64 to move toward the shallow ends of the slots 62 so as to prevent the carriage 26 from being moved at a speed greater than the speed of the shaft. Thus, the carriage 26 is prevented from being pulled radially outward along the arm 24 at a speed greater than the rotational speed of the input shaft 110. Movement of the carriage 26 toward the axis of the arm 24 away from the operator is not restricted by the over-running clutch 108 and may be carried out at any desired speed.

In order to operate the saw of the second embodiment of the invention in a crosscutting operation, the cable 96 is released from the carriage bracket 94 by removal of the quick disconnect pin 132, and the plunger 122 is locked in a position out of engagement with the contact switch 124 by any conventional means. Thereafter, the carriage 26 is freely movable along the arm and may be rotated to any desired angle relative to the arm.

Although various features of the present invention have been described with reference to only one of the preferred embodiments, it is noted that any of the features described with reference to one of the embodiments could be employed in other embodiments without departing from the scope of the present invention. For example, an override assembly such as that illustrated in FIGS. 5 and 6 or a setting means could be employed in the kick-preventing apparatus of FIG. 8.

Although the invention has been described with respect to the illustrated embodiments thereof, it is noted that substitutions may be made and equivalents employed herein without departing from the scope of the invention as recited in the claims.

What is claimed is:

1. In a power driven saw including a carriage adapted to support a saw blade for rotational movement relative to the carriage about an axis of rotation, means for supporting the carriage for linear movement in first and second directions perpendicular to the axis of rotation of the blade, and power means for rotating the saw blade about the axis of rotation for carrying out a sawing operation, the improvement comprising:
   kick-preventing means for limiting the maximum speed at which the carriage may be moved in the first direction to a predetermined speed, the kick-preventing means permitting the carriage to be moved in the first direction at any speed equal to or less than the predetermined speed while preventing the carriage from kicking in the first direction at a speed greater than the predetermined speed;
   the kick-preventing means including a drive means, an over-running clutch, and a carriage-movement control assembly, the over-running clutch having an input shaft connected to the drive means and an output shaft connected to the carriage-movement control assembly and being operable to prevent rotational movement of the output shaft of the clutch in at least one direction at a speed greater than the speed of rotation of the input shaft of the clutch such that the carriage-movement control assembly limits the maximum travel speed of the carriage to the predetermined speed, wherein the drive means includes a motor.

2. The power driven saw as recited in claim 1, wherein the kick-preventing means includes setting means for adjusting the predetermined speed at which the carriage may be moved in the first direction.

3. The power driven saw of claim 1 wherein: the drive means includes the power means for rotating the saw.

4. The power driven saw as recited in claim 1, further comprising deactivation means for deactivating the kick-preventing means in order to permit unrestricted movement of the carriage in both the first and second directions.

5. The power driven saw as recited in claim 4, wherein the deactivation means includes switch means for switching off the power means whenever the kick-preventing means is deactivated.

6. In a power driven saw including a carriage adapted to support a saw blade for rotational movement relative to the carriage about an axis of rotation, means for supporting the carriage for linear movement in first and second directions perpendicular to the axis of rotation of the blade, and power means for rotating the saw blade about the axis of rotation for carrying out a sawing operation, the improvement comprising:
   kick-preventing means for limiting the maximum speed at which the carriage may be moved in the first direction to a predetermined speed, the kick-preventing means permitting the carriage to be moved in the first direction at any speed equal to or less than the predetermined speed while preventing the carriage from kicking in the first direction at a speed greater than the predetermined speed;
   the kick-preventing means including a drive means, an over-running clutch, and a carriage-movement control assembly, the over-running clutch having an input shaft connected to the drive means and an output shaft connected to the carriage-movement control assembly and being operable to prevent rotational movement of the output shaft of the clutch in at least one direction at a speed greater than the speed of rotation of the input shaft of the clutch such that the carriage-movement control assembly limits the maximum travel speed of the carriage to the predetermined speed, wherein the drive means includes the power means for rotating the saw blade.

7. The power driven saw as recited in claim 6, wherein the power means includes an electric motor having a rotatable output shaft and the drive means includes a gear reduction assembly having an input and an output, means for transmitting rotational movement of the output shaft of the motor to the input of the gear reduction assembly, and means for transmitting rotational movement from the output of the gear reduction assembly to the input shaft of the over-running clutch.

8. The power driven saw as recited in claim 7, wherein the gear reduction assembly includes means for varying the gear reduction ratio of the gear reduction assembly.

9. A kick-preventing apparatus for use with a saw including a mounting arm, a carriage mounted on the arm for linear movement in first and second directions along the arm, the carriage being adapted to support a saw blade for rotational movement relative to the carriage about an axis of rotation extending in a direction transverse to the linear direction of travel of the carriage, and power means adapted to rotate the saw blade about the axis of rotation for carrying out a sawing operation, the kick-preventing assembly comprising:
   speed limiting means for limiting the maximum speed at which the carriage may be moved in the first direction along the mounting arm to a predetermined speed, the speed limiting means permitting the carriage to be moved in the first direction at any speed equal to or less than the predetermined speed while preventing the carriage from moving in the first direction at a speed greater than the predetermined speed;

movement permitting means for permitting substantially unrestricted movement of the carriage in the second direction along the mounting arm;

actuating means for enabling the kick-preventing apparatus to permit movement of the carriage in the first direction along the arm at a speed slower than the predetermined speed;

locking means for preventing movement of the carriage in the first direction when the actuating means is not operated; and deactivation means for deactivating the locking means in order to permit unrestricted movement of the carriage in both the first and second directions, wherein the speed limiting means includes a drive means, an over-running clutch, and a carriage movement control member adapted to extend between the over-running clutch and the carriage, the deactivation means including detachment means for detaching the carriage-movement control member from the carriage.

10. The power driven saw of claim 9 wherein:

the kick-preventing means includes setting means for adjusting the predetermined speed at which the carriage may be moved in the first direction.

11. The power driven saw of claim 9 wherein:

the speed limiting means includes a cable and the deactivation means for deactivating the locking means includes a detachable joint for detaching the cable from the carriage.

12. The power driven saw of claim 9 wherein:

the deactivation means includes switch means for switching off the power means whenever the kick-preventing means is deactivated.

* * * * *